United States Patent [19]
Kelly et al.

[11] Patent Number: 5,184,314
[45] Date of Patent: Feb. 2, 1993

[54] MOBILE DATA PROCESSING AND COMMUNCATIONS SYSTEM WITH REMOVABLE PORTABLE COMPUTER

[76] Inventors: Edward J. Kelly, 3317 Skyview, Lynchburg, Va. 24501; Joseph P. Howard, 25 Cedar Dr., Lebanon, Oreg. 97355

[21] Appl. No.: 738,559

[22] Filed: Jul. 31, 1991

[51] Int. Cl.$^5$ ............................................. G06F 1/00
[52] U.S. Cl. ............................................. 364/709.01
[58] Field of Search ............... 364/200, 705.06, 708, 364/709.01, 709.04, 709.11, 709.12; 379/96; 340/711, 712

[56] References Cited

U.S. PATENT DOCUMENTS

| | | | |
|---|---|---|---|
| 4,654,818 | 3/1987 | Wetterau, Jr. | 364/709.12 |
| 4,806,906 | 2/1989 | Oda et al. | 364/709.01 X |
| 4,850,009 | 7/1989 | Zook et al. | 379/96 |
| 4,916,441 | 3/1990 | Gombrich | 364/709.11 |
| 5,023,824 | 6/1991 | Chadima | 364/708 |

*Primary Examiner*—Jerry Smith
*Assistant Examiner*—Chuong D. Ngo
*Attorney, Agent, or Firm*—Harold E. Meier

[57] ABSTRACT

A mobile data processing and communications system having a keyboard converter mounted in a vehicle and detachably interconnected to a self-contained removable hand-held portable computer. The hand-held portable computer includes a microprocessor with an interactive display and an integral internal RF antenna to enable the user to perform data processing and communications functions outside the vehicle. When the hand-held portable computer interfaces with the keyboard converter, the user may enter data through the keyboard converter and communicate via an external RF antenna attached to the vehicle.

10 Claims, 2 Drawing Sheets

MOBILE DATA PROCESSING AND COMMUNCATIONS SYSTEM WITH REMOVABLE PORTABLE COMPUTER

TECHNICAL FIELD

The invention relates to a mobile data processing and communication system having a removable portable personal computer with RF communications capability.

BACKGROUND OF THE INVENTION

For public safety and law enforcement organizations, such as police and sheriff's departments, central computers and data bases of information are now indispensable to performing their duties, especially in large metropolitan areas with a highly mobile citizenry. For example, it has become routine for police officers, when stopping automobiles, to check the license plate number of the automobile stopped against those reportedly stolen, and the license number and name of the driver stopped against persons for whom a warrant has been issued or who are wanted for some other reason.

Until recently, public safety officers checked the identity of individuals or automobiles who have been detained by first transmitting information on the individual to a central dispatcher on a two-way voice radio link. The dispatcher then communicated the information to a central computer data base operator. Receiving an answer in the field took several minutes after the initial inquiry by the public safety officer. Not only did the public safety officer have to wait, thereby preventing the officer from patrolling, reducing the number of officers in the field and increasing response time to calls for help, but in many instances the officer was unable to detain the individual or automobile long enough to complete the check.

These problems have been solved, only in part, by mobile data terminals. Mobile data terminals (MDTs) are mounted in patrol vehicles having a radio transmitter and receiver. The MDT is connected to an externally mounted antenna to establish a direct radio communications link with a central computer and data base. With an MDT unit in their vehicle, police officers spend less time checking and more time patrolling, responding to calls and apprehending suspected criminals.

To use an MDT, the public safety officer is required to return to the patrol vehicle where the MDT is permanently located. To obviate this problem, other recent innovations include hand-held portable data terminals (PDTs) with radio communications capabilities. Thus, a PDT with a radio transmitter is capable of establishing a direct radio link from the field with the central computer. PDTs configured as described above act like MDTs.

These new law enforcement tools, the MDT and the PDT, improve access to central data bases and, consequently, enhance the performance efficiency of the public safety officers in the field. However, public safety officers must also spend several hours each day writing or compiling reports, usually in their office or in the station house. The MDTs and PDTs in their present form are incapable of data processing functions. Some public safety organizations have, thus, provided their officers with portable "lap top" personal computers on which to prepare reports. However, these lap top computers are just one more piece of equipment that must be carried by public safety officers inhibiting their ability to perform their duties.

Thus, the overall field needs of public safety officers have not been recognized, much less addressed or solved, by the present MDT, PDT and lap-top computer technology.

SUMMARY OF THE INVENTION

The present invention comprehensively addresses the problem of providing full-service data processing and communications capabilities to public safety officers and others similarly situated in the field. The invention permits public safety officers to retrieve data from, and enter and process data into a central computer and data base while on foot, in a motor vehicle, or even in an office. The invention is an integrated, mobile and portable data processing and communications system that includes a keyboard converter inter-connected to a self-contained removable hand-held or "portable" computer.

The keyboard converter includes a cradle for receiving the hand-held portable computer. An optical interface is provided for coupling the portable computer to a full-size "Qwerty" keyboard located on the keyboard converter. External input/output and storage devices located on the keyboard converter are also provided. The full-size keyboard permits public safety officers to input data when the hand-held portable computer is resting in the cradle. The keyboard converter is mounted to the interior of the patrol vehicle and is detachable for field use if the hand-held portable computer is present in the cradle. The keyboard converter further includes a transceiver for coupling an RF signal generated by the portable computer to an externally mounted antenna to access the central computer.

The hand-held portable computer includes a means for data processing, means for storing data, and a transceiver for transmitting and receiving data to and from the central computer and data base when the hand-held portable computer is not attached to the keyboard converter. The hand-held portable computer is mounted within an enclosure that fits the shape of the keyboard converter cradle allowing the computer to interface with the keyboard converter through an optical interface. A display, located on top of the hand-held portable computer, serves to provide visual information for both the hand-held portable computer and the keyboard converter. When the portable computer is being carried by hand, the display is "interactive," allowing the user to enter data by touching a keyboard pad outlined on part of the display. When the portable computer is resting in the keyboard converter cradle, data is entered into the portable computer through the full-size keyboard on the keyboard converter, making the full display available for displaying information.

With the invention, a police officer, for example, involved in making an arrest can contact the central computer and data base to check for outstanding warrants, access all relevant and up-to-date information concerning the individual, retrieve a form, enter narrative information concerning the arrest and file a report. This can all be done within minutes of the arrest freeing the officer to perform more important duties.

The mobile data processing and communications system of the present invention may be adapted for use in other mobile service related fields such as appliance repair, delivery services, and public utility service, repair and meter reading. Other advantages and applications deriving from the use of the mobile data processing and communications systems of the present invention will readily suggest themselves to those skilled in the art from consideration of the following Detailed Description taken in conjunction with the accompanying Drawings.

BRIEF DESCRIPTION OF THE DRAWINGS

A complete understanding of the invention may be had by reference to the following Detailed Description when taken in conjunction with the accompanying Drawings wherein.

DETAILED DESCRIPTION OF THE DRAWINGS

While the apparatus of the present invention is disclosed herein with respect to its preferred embodiment as a law enforcement tool, it will be understood that the invention is not so limited in application.

Figure 1:
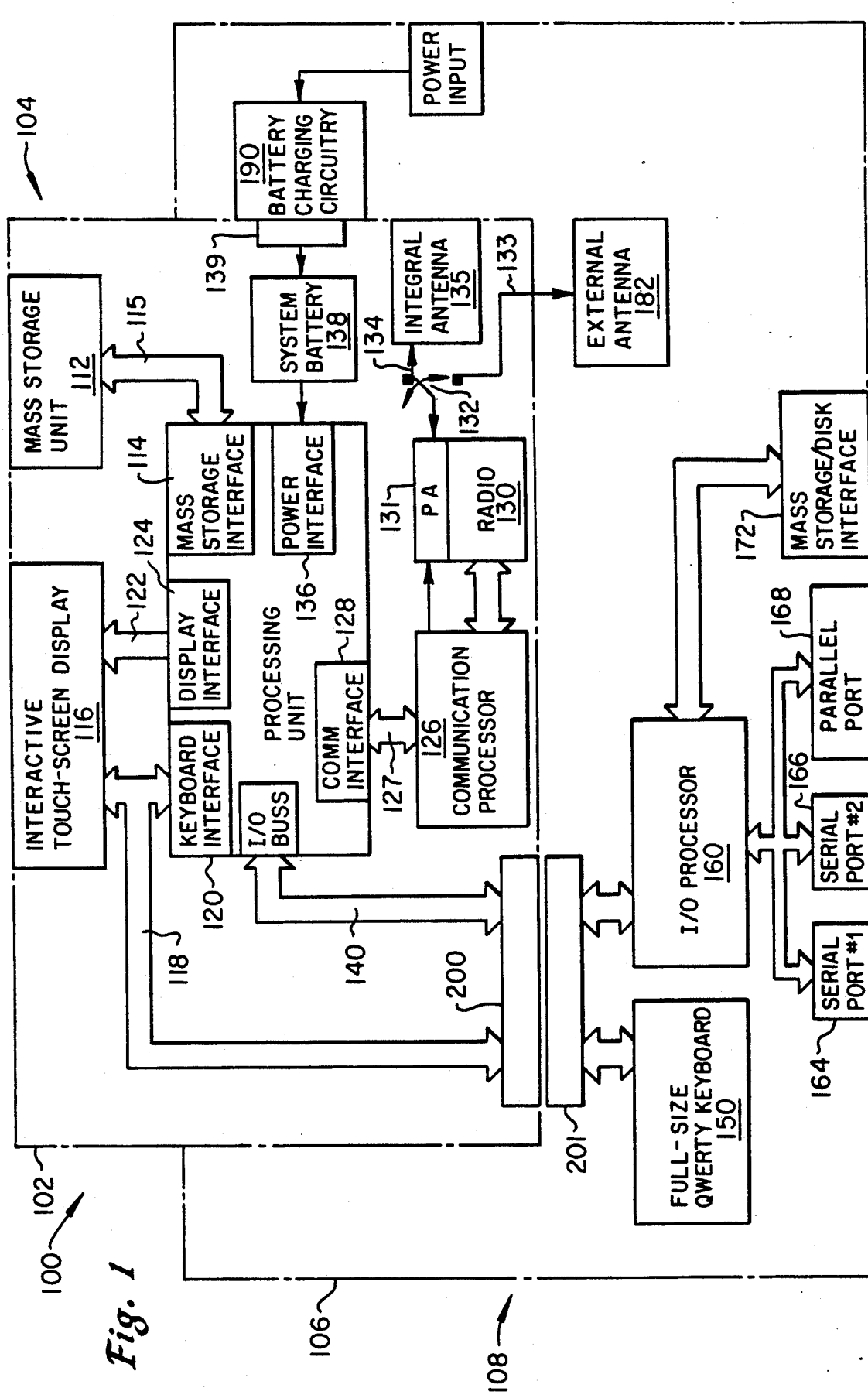
FIG. 1 is a block diagram of the mobile data processing and communications system including the hand-held portable computer and keyboard converter.
Figure 2:
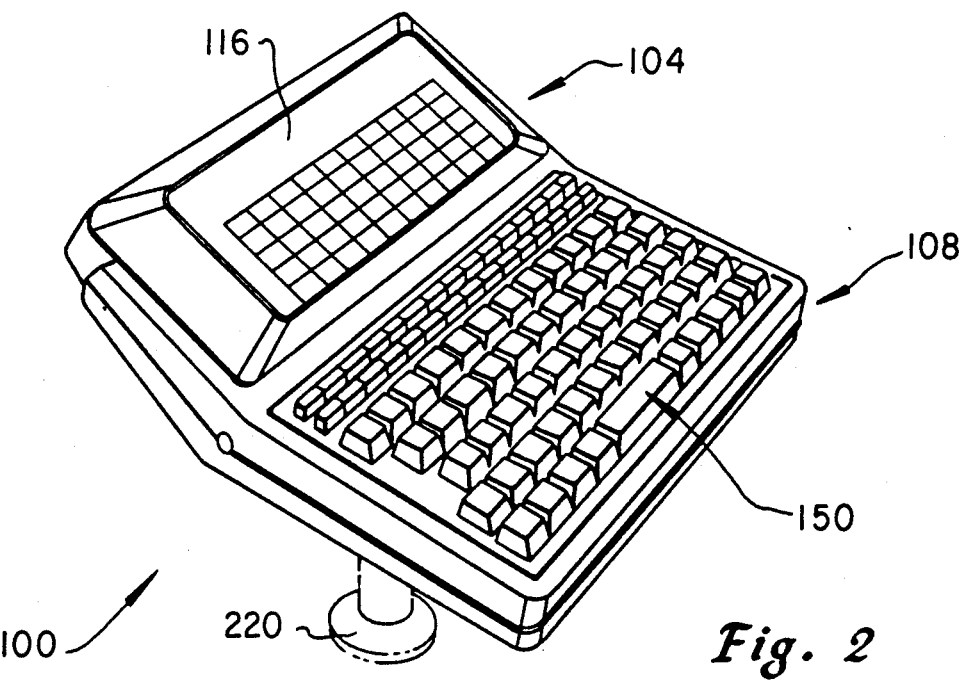
FIG. 2 is a perspective view of the system of the present invention showing a hand-held portable computer resting within the keyboard converter cradle.

Referring now to FIGS. 1 and 2, the mobile data processing and communications system 100 of the present invention includes an enclosure 102 of a hand-held portable computer 104 that rests in, and is detachably removed from, a cradle 109 (shown only in FIG. 3) formed in the enclosure 106 of a keyboard converter 108.

Within the enclosure 102 of the portable computer 104, a processing unit 110 handles all data processing functions for the portable computer, including running application programs such as a word processor program or communications program. The processing unit 110 includes a programmable microprocessor unit (not shown) and memory (not shown). A mass storage unit 112, which typically is a magnetic or optical disk drive unit, or a ROM or RAM based memory module or card, is used to store application programs and data files. A mass storage interface 114 connects the processing unit 110 with the mass storage unit 112 through a storage bus 115. An interactive touch-screen display 116 is used for both displaying and, if desired, manually entering data. When the hand-held computer 104 is detached from the keyboard converter 108, the processing unit 110 configures the interactive display 116 for both input and output of data. Data is input by touching a "key" on the keyboard image displayed on the interactive display 116. Data entered via the interactive display 116 is coupled through a keyboard bus 118 and a keyboard interface 120 to the processing unit 110. Information to be displayed on the interactive display 116 is coupled from the processing unit 110 through a display bus 122 and a display interface 124.

A communications processor 126 converts the protocol of signal data received on communications bus 127 from the processing unit 110 through communications interface 128 into a protocol suitable for RF transmission. Similarly, the communications processor 126 converts the protocol of RF signal data received and detected by radio 130 to the protocol of the processing unit 110, supplying the converted data to the communications interface 128 on communications bus 127.

Power for the hand-held portable computer 104 and keyboard converter 108 is provided by a rechargeable battery 138. A power interface 136 in the processing unit 110 regulates and distributes power from the system battery 138 to the hand-held portable computer 104. Battery 138 is recharged each time the hand-held portable computer 104 is returned to the cradle in the keyboard converter 108 by means of a battery charger 190 located within the enclosure 106 of the keyboard converter 108. A power input 192 supplies power for the battery charger 190. A plug 139 transmits power from the battery charger 190 on the keyboard converter 108 to the battery 138 on the hand-held portable computer 104.

When the hand-held portable computer 104 is removed from the keyboard converter 108, radio communications with the central computer data base may be effectuated through an integral internal antenna 135. The communications processor 126 controls the radio 130 and amplifies the RF transmission through a power amplifier 131. A switch 132 connects the transmission output signal from power amplifier 131 to the integral antenna 135 through transmission line 134. Data may then be transmitted to and from the central computer data base by the hand-held portable computer 104.

When the hand-held portable computer 104 is attached to the keyboard converter 108, radio communications with the central computer data base continue to be controlled by the communications processor 126 within the hand-held portable computer. The switch 132 instead directs the transmission output signal from the radio 130 and power amplifier 131 to the keyboard converter 108 through transmission line 133. A second power amplifier 180 located within the enclosure 106 of the keyboard converter 108 receives the transmission output signal from the communications processor 126 through transmission line 133 and generates the RF signal transmitted to the external antenna 182 of the mobile data processing and communications system 100.

Data may also be entered into the processing unit 110 through the keyboard converter 108 by using a full-size "Qwerty" keyboard 150 located within the enclosure 106 of the keyboard converter 108. When the hand-held portable computer 104 is resting in the cradle of the keyboard converter 108, interactive display 116 is configured by processing unit 110 in a display mode. Data from the keyboard 150 is coupled to the keyboard interface 120 of the processing unit 110 through the same keyboard bus 118 used by the interactive display 116.

Additional data storage and input/output capability is provided by the input/output processor 160 located within the keyboard converter 108. Input/output processor 160 converts the protocol of data received over the input/output bus 140 from the processing unit 110 to the protocol necessary for further output to the serial ports, 164 and 166, parallel port 168 and mass storage unit 172. Similarly, the input/output processor 160 converts the protocol of data received from the output devices to the protocol of the processing unit 110, supplying the converted data to the data processing unit over the input/output bus 140.

Data on the keyboard bus 118 and input/output bus 140 is passed between the hand-held portable computer 104 and the keyboard converter 108 by means of a pair of optical interfaces, 200 and 201, located on the hand-held portable computer 104 and keyboard converter 108 respectively. Optical interface 200 converts the digital data sent by the processing unit 110 to the keyboard converter 108 and present on the keyboard bus 118 and input/output 140 into light pulses that are detected and reconverted into digital signals by optical interface 201 located on the keyboard converter 108. Similarly, optical interface 201 converts digital data sent by the keyboard 150 or the input/output processor 160 into light pulses that are detected and reconverted by optical interface 200 into digital signals for the processing unit 110.

Figure 3:
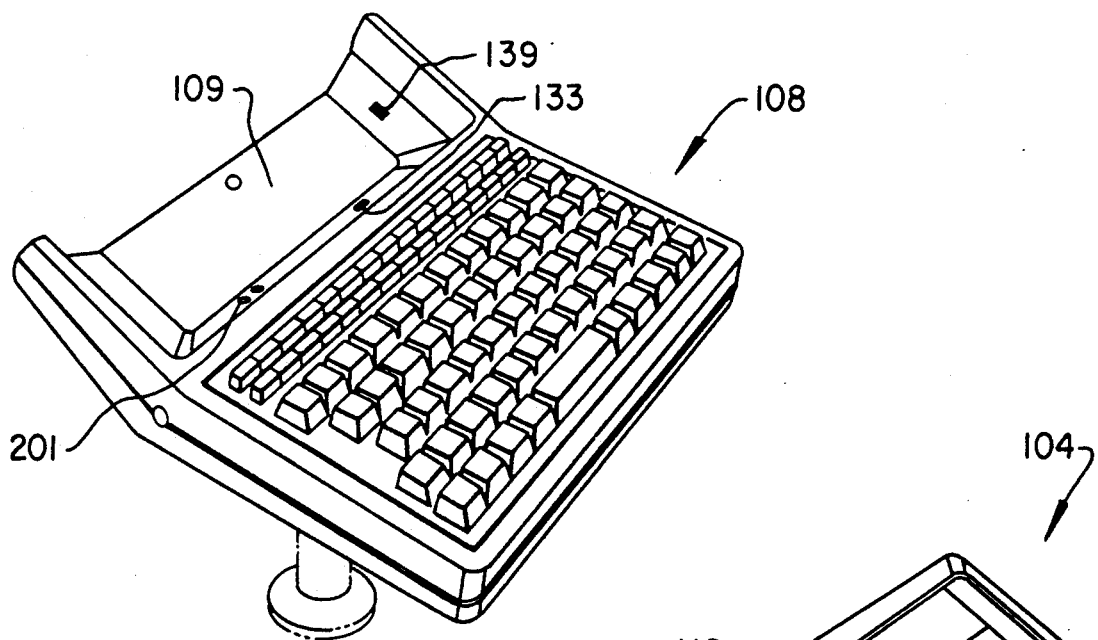
FIG. 3 is a perspective view of the keyboard converter showing the cradle for the hand-held portable computer.
Figure 4:
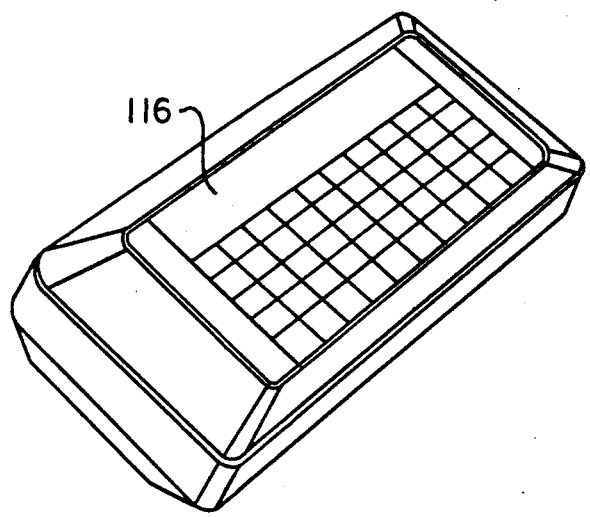
FIG. 4 is a perspective view of the hand-held portable computer.

In FIGS. 2, 3 and 4 there is illustrated a preferred embodiment of the hand-held portable computer and keyboard converter, 104 and 108 respectively. FIG. 2 shows the mobile data processing communications system 100 having a hand-held portable computer 104 resting in the keyboard converter 108. The keyboard converter 108 is detachably mounted to the law enforcement or other type of vehicle by means of a pedestal 220. Thus, the complete mobile data processing and communication system 100 may be removed from the vehicle by the police officer to enable portable use outside the vehicle of the full-size keyboard 150.

When the hand-held portable computer 104 is attached to the keyboard converter 108, interactive display 116 is configured to operate solely as a display. A law enforcement officer or other operator would then enter data via the full-size keyboard 150 and communicate with the central computer data base via the external antenna of the mobile data processing and communication system 100.

FIG. 3 shows the keyboard converter 108 including the cradle 109 for receiving the hand-held portable computer 104. Preferred locations for the optical interface 201, transmission line 133 and the power plug 139 are also shown.

FIG. 4 shows the hand-held portable computer 104 detached from the keyboard converter 108. When detached from the keyboard converter 108, data may be entered and displayed via the touch-screen interactive display 116 of the hand-held portable computer 104. The integral internal antenna located within the hand-held portable computer 104 permits the law enforcement officer or other user to continue to communicate with the central computer data base.

Although a preferred embodiment of the invention has been illustrated in the accompanying Drawings and described in the foregoing Detailed Description, it will be understood that the invention is not limited to the embodiment disclosed but it capable of numerous rearrangements and modifications of parts and elements without departing from the scope of the invention set forth and defined by the following claims.

We claim:

1. A mobile data processing and communications system comprising:
    a hand-held portable computer having a touch-screen interactive display, a microprocessor and a communications processor, the portable computer having a first mode of operation wherein data is entered through, and displayed on the touch-screen interactive display, said portable computer further including a means coupled to the communications processor for transmitting data by RF transmission to a central computer;
    a keyboard converter having a full size Qwerty keyboard, an input/output processor, a means for transmitting data by RF transmission and a cradle for receiving the hand-held portable computer; and
    means for interfacing the hand-held portable computer with the keyboard converter when the keyboard converter cradle receives the portable computer, the portable computer having a second mode of operation wherein data may be input to the portable computer through the Qwerty keyboard and displayed on the touch-screen interactive display of the portable computer, said means for interfacing including means to enable transmission of data to the central computer from the means for transmitting of the keyboard converter when the keyboard converter cradle receives the portable computer.

2. The mobile data processing and communications system according to claim 1 wherein the means for transmitting data from the portable computer includes an RF integral antenna for RF transmission during the first mode of operation of the hand-held portable computer.

3. The mobile data processing and communications system according to claim 1 wherein the means for transmitting data from the keyboard converter includes an external antenna for RF transmission during the second mode of operation of the hand-held portable computer.

4. The mobile data processing and communications system according to claim 1 wherein the means for interfacing the hand-held portable computer with the keyboard converter comprises a digital-to-optical, optical-to-digital interface.

5. A mobile data processing and communications system comprising:
    a hand-held portable computer;
    a keyboard converter having a full size Qwerty keyboard and a cradle for receiving the hand-held portable computer;
    means for interfacing data transmission between said hand-held portable computer and said keyboard converter during a second mode of operation of the portable computer;
    means for entering data through the portable computer during a first mode of operation of the portable computer;
    means for transmitting data from the portable computer to a central computer data base by RF transmission during the first mode of operation of the portable computer;
    means for entering data into the portable computer through the keyboard converter when the portable computer rests in the cradle of the keyboard converter; and
    means for transmitting data from the keyboard converter to a central computer by RF transmission when the portable computer rests in the cradle of the keyboard converter.

6. A mobile data processing and communications system according to claim 5 wherein said hand-held portable computer comprises a touch screen interactive display, a communications processor and a microprocessor coupled to said touch-screen interactive display and said communications processor.

7. A mobile data processing and communications system according to claim 6 wherein said means for transmitting data by RF transmission includes an amplifier and an integral internal antenna.

8. A mobile data processing and communications system according to claim 5 wherein said keyboard converter further comprises an input/output processor, and a plurality of serial ports, a parallel port and a mass storage means.

9. A mobile data processing and communications system according to claim 8 wherein said means for transmitting data by RF transmission comprises an amplifier coupled to an external antenna.

10. A mobile data processing and communications system according to claim 5 wherein said means for interfacing comprises a digital-to-optical, optical-to-digital interface.

* * * * *